United States Patent
Schalles et al.

(10) Patent No.: US 9,091,601 B2
(45) Date of Patent: Jul. 28, 2015

(54) METHOD AND APPARATUS FOR CALIBRATING A THERMOMETER IN SITU

(75) Inventors: Marc Schalles, Erfurt (DE); Dirk Boguhn, Munich (DE); Peter Seefeld, Pfronten (DE); Reinhard Buchner, Nesselwang (DE)

(73) Assignee: ENDRESS + HAUSER WETZER GMBH + CO. KG, Nesselwang (DE)

( * ) Notice: Subject to any disclaimer, the term of this patent is extended or adjusted under 35 U.S.C. 154(b) by 411 days.

(21) Appl. No.: 13/217,330

(22) Filed: Aug. 25, 2011

(65) Prior Publication Data

US 2012/0051389 A1    Mar. 1, 2012

Related U.S. Application Data

(60) Provisional application No. 61/344,616, filed on Aug. 31, 2010.

(51) Int. Cl.
*G01K 15/00* (2006.01)

(52) U.S. Cl.
CPC ............ *G01K 15/002* (2013.01); *G01K 15/005* (2013.01)

(58) Field of Classification Search
CPC ....... G11C 11/22; G11C 13/004; G01K 7/343
USPC ............... 374/1, 2, 163, 183, 184, 185, 100, 374/141.16; 702/130, 99; 257/532, 295
See application file for complete search history.

(56) References Cited

U.S. PATENT DOCUMENTS

| | | | |
|---|---|---|---|
| 2,949,594 A | | 8/1960 | Tava et al. |
| 3,059,229 A | | 10/1962 | Tava et al. |
| 3,250,126 A | * | 5/1966 | Shapiro .......................... 374/177 |
| 3,257,607 A | * | 6/1966 | Pintell ............................ 323/293 |
| 3,345,874 A | * | 10/1967 | Carniol et al. ................. 374/177 |
| 3,644,864 A | * | 2/1972 | Hirsbrunner et al. ........... 338/25 |
| 3,759,104 A | * | 9/1973 | Robinson ...................... 374/177 |
| 4,210,024 A | * | 7/1980 | Ishiwatari et al. ............ 374/183 |
| 4,332,081 A | * | 6/1982 | Francis ............................ 29/612 |
| 4,348,611 A | * | 9/1982 | Ruppel et al. ................. 313/388 |

(Continued)

FOREIGN PATENT DOCUMENTS

| | | |
|---|---|---|
| DE | 2758084 | 6/1979 |
| DE | 3031339 | 4/1982 |

(Continued)

OTHER PUBLICATIONS

International Preliminary Report on Patentability in PCT/EP2011/062753, issued Mar. 5, 2013, English translation thereof.

(Continued)

*Primary Examiner* — Gail Kaplan Verbitsky
(74) *Attorney, Agent, or Firm* — Bacon & Thomas, PLLC

(57) ABSTRACT

The invention relates to an apparatus for the calibration of a thermometer in situ, wherein the apparatus has a temperature sensor (S) for determining a temperature (T); wherein a reference element (K) is provided for calibrating the temperature sensor (S); wherein the reference element (K) at least partially comprises a ferroelectric material (D), which experiences a phase transformation at least one predetermined temperature ($T_{Ph}$) in a temperature range relevant for calibrating the temperature sensor (S).

28 Claims, 3 Drawing Sheets

(56) References Cited

U.S. PATENT DOCUMENTS

| | | | | |
|---|---|---|---|---|
| 4,545,254 | A | * | 10/1985 | Lawless et al. ............... 73/714 |
| 5,728,603 | A | * | 3/1998 | Emesh et al. .................. 438/3 |
| 5,818,043 | A | * | 10/1998 | Buchy et al. ............... 250/332 |
| 6,357,912 | B1 | * | 3/2002 | Li ........................... 374/175 |
| 6,388,255 | B1 | * | 5/2002 | Di Maio et al. .......... 250/338.2 |
| 6,639,506 | B1 | * | 10/2003 | Landis ..................... 338/25 |
| 6,824,307 | B2 | * | 11/2004 | Vail et al. ................. 374/183 |
| 7,213,967 | B2 | * | 5/2007 | Simunovic et al. ......... 374/102 |
| 7,896,544 | B2 | * | 3/2011 | Nagashima et al. ......... 374/176 |
| 2007/0242727 | A1 | * | 10/2007 | Hilgers ................... 374/186 |
| 2008/0013591 | A1 | * | 1/2008 | Kim et al. ..................... 374/1 |
| 2008/0304545 | A1 | * | 12/2008 | Schubring et al. ......... 374/177 |

FOREIGN PATENT DOCUMENTS

| | | |
|---|---|---|
| DE | 40 06 885 | 10/1990 |
| DE | 4032092 | 4/1992 |
| DE | 4035952 | 6/1992 |
| DE | 197 02 140 | 7/1998 |
| DE | 69130843 | 6/1999 |
| DE | 19805184 | 8/1999 |
| DE | 199 41 731 | 3/2001 |
| DE | 19941731 | 3/2001 |
| DE | 19954164 | 6/2001 |
| DE | 102004003853 | 8/2005 |
| DE | 102004027072 | 2/2006 |
| DE | 102005029464 | 12/2006 |
| EP | 1247268 | 8/2009 |
| RU | 91 426 U1 | 10/2010 |
| WO | WO 97/25602 | 7/1997 |

OTHER PUBLICATIONS

International Search Report in corresponding PCT Application No. PCT/EP2011/062753.
German Search Report in corresponding German Application No. 10 2010 040 039.4.

* cited by examiner

METHOD AND APPARATUS FOR CALIBRATING A THERMOMETER IN SITU

CROSS-REFERENCE TO RELATED APPLICATION

This application is a Nonprovisional which claims the benefit of U.S. Provisional Application No. 61/344,616, filed on Aug. 31, 2010.

TECHNICAL FIELD

The invention relates to an apparatus and a method for calibrating a thermometer in situ, wherein the apparatus has a temperature sensor for determining a temperature.

BACKGROUND DISCUSSION

Currently, the calibration of thermometers is usually performed in calibration baths, ovens or fixed point systems. A corresponding fixed point cell is described in DE 102004027072 B3, for example. In this case, the measurement deviation of the thermometer to be calibrated is determined at determined temperature values, also referred to as fixed temperature values. The thermometer is uninstalled from the measuring point, plugged into the calibration system and calibrated for this purpose. However, this type of calibration is complicated due to the required removal of the thermometer. Consequently, it has been known from the state of the art to calibrate a thermometer in the installed state. Such a fixed point cell, miniaturized and integrated in a thermometer, has become known from Offenlegungsschrift DE 19941731 A1. In such case, it is suggested to plug the temperature sensor to be calibrated into a cell located in a measuring component; the cell is filled with a fixed point substance, most often a metal or a eutectic alloy. When the fixed point substance is brought to melting or solidification temperature, the thermometer measures this melting point temperature. The measured melting point temperature can then be compared to a stored melting point temperature. In such case, the requirement of an additional cell for encapsulating the fixed point substance is a disadvantage. In this way, dynamics of the thermometer, i.e. the response time to temperature changes, worsen. Moreover, the fixed point substance can exit from the cell in some circumstances and so destroy the thermometer.

A method for ascertaining the Curie temperature of ferromagnetic materials has become known from patent DE 4032092 C2, in which the abrupt change of the heat absorption in the region of the Curie temperature is not detectable by measuring using a differential scanning thermal analyzer, and, consequently, additional apparatuses for applying a magnetic field are provided.

Offenlegungsschrift DE 19805184 A1 describes a method for ascertaining the temperature of a piezoelectric element. In such case, the temperature of the piezoelement is determined via the capacitance of the piezoelement.

Additionally, DE 102005029464 B4 relates to the compensation of piezo influences on an integrated semiconductor circuit.

DE 102004003853 B4 relates to integrated circuit arrangements in a semiconductor substrate and to a concept for compensating the negative influence of a mechanical stress component in the semiconductor substrate on the parameter accuracy and parameter stability of a circuit arrangement integrated on the semiconductor substrate.

Finally, DE 69130843 T2 relates to a method and apparatus for determining the temperature of a piezoelectric crystal oscillator.

Offenlegungsschrift DE 19954164 A1 describes a sensor for measuring mechanical loading acting on a surface of a mechanical component.

Another way of calibrating a plurality of integrated temperature sensors in situ has become known from patent EP 1247268 B2. For this, one or a number of reference elements, in the form of temperature sensors, are installed in a thermometer component in addition to a primary temperature sensor. These usually differ from the primary temperature sensor in construction or material used and consequently have, in comparison to the primary temperature sensor, different aging effects and characteristic curve drifts. Thus, for example, semiconductors known as NTC/PTC resistors are used as reference elements in parallel with the primary Pt100 resistance sensors. The significant disadvantage of these arrangements is that only sensors with different characteristic curves or aging characteristics can be used as a reference. These must still be more exactly known or the characteristic curve changes due to aging should be smaller than those of the primary temperature sensor to be monitored. Particularly in the case of the calibration/validation of resistance thermometers, which are already very stable long term in broad temperature ranges, this has not been attainable so far.

SUMMARY OF THE INVENTION

An object of the invention, therefore, is to enable a stable calibration or validation of a temperature sensor over a long term.

The object is achieved by the invention by providing a reference element for calibrating the temperature sensor; wherein the reference element at least partially comprises a ferroelectric material, which experiences a phase transformation at least one predetermined temperature within the temperature range relevant for calibration of the temperature sensor.

Thus, the invention relates to calibrating thermometers in situ, wherein the temperature sensor (primary sensor) is calibrated or validated with the assistance of, for example, a secondary sensor (reference element) likewise located in the thermometer component. The phase transformation and the associated change of at least one of the physical properties of the reference element can then be utilized to calibrate the temperature sensor. The reference element, in such case, is at least partially a ferroelectric material, which has one or a number of phase transformations, especially in the solid state, in the temperature range relevant for the calibrating. These phase transformations take place at known, fixed, and predetermined temperature values stable over a long term. If one of these phase transformation temperatures, especially the Curie temperature, is exceeded, so that a phase transformation is initiated, a distinctive curve, especially of the dielectric constant of the ferroelectric material arises as a function of temperature and this curve can be utilized for calibrating. The polarization of the ferroelectric material disappears in the phase transition from a ferroelectric to a paraelectric state arising at the Curie temperature. The material, from which the reference element thus is at least partially comprised, is then paraelectric. The phase transition from the paraelectric to the ferroelectric state of the material, from which the reference element is at least partially comprised, can naturally also be utilized for calibrating or validating the temperature sensor.

Ferroelectric materials, also called ferroelectrics, are materials, which possess an electrical polarization, even without application of an electrical field, especially below the Curie temperature. This polarization is attributed to the crystal structure of the ferroelectric material. If a capacitor element is constructed using such a ferroelectric material, a typical, often abrupt, change of the dielectric properties can be detected by the corresponding change of its electrical capacitance. Continuous changes of the dielectric constant with the temperature, as described in patent DE 4035952 C1, for example, for the continuous measurement of temperature are not taken into consideration in such case. Only the quasi discontinuous (almost abrupt) physical, i.e. electrical or dielectric changes at the phase transformation of the ferroelectric material preferably serving as dielectric of a capacitor element can be registered and evaluated. For example, barium titanate, lead zirconate titanate, strontium bismuth tantalite, etc. are known ferroelectric materials. Other examples of such ferroelectric materials are known from the state of the art.

If a capacitor element is used as a reference element, then the measuring of the capacitance of the capacitor element can occur in such case using a capacitance measurement principle known from the state of the art. The form of the capacitance and the electrode arrangement comprising the capacitor element are likewise relatively freely selectable. Options include e.g. an embodiment as a plate capacitor or as a cylinder.

Alternatively, the ferroelectric material can also be used as a substrate, on which resistance structures are applied using thin film technology, for example. The volume changes of the ferroelectric material arising at the Curie temperature or other temperatures with a phase transition of the crystal structure effect a characteristic change of the ohmic resistance of the resistor structure.

Thus, a reference element is proposed, which, integrated in a thermometer, provides a material characterizing, fixed point temperature (e.g. the Curie temperature of a ferroelectric material used, for example, as a dielectric). The temperature sensor itself can regularly be recalibrated with this reference element—i.e. the deviation of its signal from the fixed point temperature can be ascertained.

In contrast to the state of the art, there is here no evaluating of an often only limitedly known, temperature specific, characteristic curve change of a reference element, such as a secondary sensor, nor is there a deducing of the properties of the sensor to be calibrated from the properties of the reference element changing with time. The characteristic curve changes of the temperature sensor that arise can, instead, be directly and clearly more exactly and reproducibly detected and documented using such a fixed point calibration, also over the long term. Building on that, an automatic self validation and drift prediction of the temperature sensor element can occur. An evaluating electronics, such as a temperature transmitter for example, can be implemented for the particular one point calibration of the thermometer or the temperature sensor at the fixed point temperature, as well as for validation and aging monitoring, derived, in given cases, from the calibration.

Thus for example, the exact point in time of the phase transformation at the known, specific, phase transformation temperature of the ferroelectric material can be determined from the measured capacitance curve of the reference element. From the in parallel therewith, continuously registered, measured values of the temperature sensor (e.g. a Pt100) to be calibrated, that temperature measured value, which best corresponds to the moment of the phase transformation and, thus, to the known fixed point temperature, can be ascertained especially directly by an onsite evaluating electronics of the thermometer or also at a later point in time, or also in a remote evaluation unit. The validation and/or calibration of the temperature sensor or thermometer occur(s) by determining the difference between the temperature measured by the temperature sensor and the fixed point reference temperature. A correction of the characteristic curve of the temperature sensor, a designation of the uncertainty of the measurement or a designation of a characteristic curve drift over a defined period of time or its history are likewise possible.

In an embodiment of the apparatus, the ferroelectric material is a solid body. In comparison to the state of the art, this offers the advantage that no fixed point substance in the form a liquid is present and that no special cell is needed in order to collect the fixed point substance and thus the response behavior of the temperature sensor to temperature changes is also not degraded.

In an additional embodiment of the apparatus, the ferroelectric material has a crystal structure and the crystal structure of the ferroelectric, material changes during the phase transformation. Besides the Curie temperature already mentioned, the crystal structure of the ferroelectric material can change at other temperatures. In the case of barium titanate, for example, this also happens at temperatures of about −90° C. and about 5° C. Even at these other temperatures, a change in the electrical, dielectric or volumetric properties of the ferroelectric material can be detected and utilized for a calibration or validation of the temperature sensor. In an additional embodiment of the apparatus, the ferroelectric material thus has electrical or dielectric properties, which change with the phase transformation.

In an additional embodiment of the apparatus, the reference element has more than one ferroelectric material with one or a plurality of reference temperatures (in each case), which are likewise utilized for the calibration or validation of the thermometer or temperature sensor. The reference element especially comprises at least partially more than one ferroelectric material.

In an additional embodiment of the apparatus, the phase transformation, especially the change of the electrical or dielectric properties, of the ferroelectric material occurs abruptly at least one predetermined temperature value. This expresses itself, for example, in a step like curve of the dielectric constant in the region of the predetermined temperature value, i.e. the phase transformation temperature.

In an additional embodiment of the apparatus, the reference element comprises a capacitor element with a dielectric, wherein the dielectric of the capacitor element at least partially comprises the ferroelectric material. In the case of a capacitor element, the capacitance or the change of the capacitance of the capacitor element can then also be used for calibration. The capacitance of such a capacitor element, especially in the region of the predetermined temperature value, i.e. the phase transformation temperature, likewise has a characteristic curve, especially a step shaped curve.

In an additional embodiment of the apparatus, the volume of the ferroelectric material changes at the phase transformation. Instead of the electrical or dielectric properties, as already mentioned, a volume change occurring at the phase transformation of the ferroelectric material can be utilized in order to calibrate the temperature sensor.

In an additional embodiment of the apparatus, the ferroelectric material serves as the substrate for a temperature sensor. Especially, the temperature sensor and reference element can be arranged on a single substrate.

In a form of embodiment, a phase transformation of the ferroelectric material of the carrier substrate from a ferroelectric state to a paraelectric state, or from a paraelectric state to a ferroelectric state and/or a change between different crystal structures occurs at least one predetermined temperature. For this purpose a suitable ferroelectric material, which, for example, is matched to the temperature range in which the thermometer or temperature sensor is applied, can be used. The phase transformation of the ferroelectric substrate material below the Curie temperature acts especially on the conductivity or the ohmic resistance of the temperature sensor applied on the substrate. This change can be brought about by a change of the electrical state of the material that comprises the substrate and/or also by a change of the crystal structure of the material that comprises the substrate.

Ferroelectric materials such as lead zirconate titanate LZT and especially barium titanate $BaTiO_3$ and strontium titanate $SrTiO_3$ as well as mixtures of the latter two have thermally induced phase transformations, wherein length changes of the lattice constants arise, which in turn effect directed changes of the volume of the carrier substrate and cause tensile and compressive strain of the applied thin films. The change of the electrical resistance of the resistance element related to this can be measured. For example, pure barium titanate crystallizes in polymorphic lattice types within the following temperature ranges:

cubic T>120° C.
tetragonal 5° C.<T<120° C.
orthorhombic −90° C.<T<5° C.
rhombohedral T<−90° C.

The measured changes of the electrical resistance of the resistance element applied on the substrate are suitable for determining the respectively present phase transformation temperature.

In an additional embodiment of the apparatus, the ferroelectric material serves as a substrate for a resistance element manufactured using thin film technology or thick film technology. The volume change of the ferroelectric material can be taken into consideration for calibration, especially in the case in which a temperature sensor is applied to the ferroelectric material serving as a substrate. For such a purpose, a characteristic change in the ohmic resistance of the temperature sensor in the region of the predetermined temperature can be used.

In an additional embodiment, such a resistance element manufactured using thin film technology, which has a ferroelectric material as a substrate, is provided with a metalizing layer on the underside of the carrier substrate, i.e., for example, the side lying opposite the resistance element. Thus, both a change of the especially ohmic resistance element as well as also using its resistor structure as a first electrode and the underside of the metalized carrier substrate as second electrode—a capacitance measurement of the capacitor thus formed are possible. The temperature sensor and reference element are thus united in a sensor structure and are thereby especially exposed to essentially the same (environmental) temperature. The resistance element, a PT100 for example, can be utilized as a sensor for measuring the temperature. The capacitance measurement of the capacitor element can then serve for determining the phase transformation temperature and/or as a calibration reference for the resistance element.

In an additional embodiment of the apparatus, the predetermined temperature is a phase transformation temperature and the ferroelectric material is doped with impurity atoms, especially in order to influence the phase transformation temperature and/or the formation of crystal domains. Alternatively, a pure substance can be used as a substrate for accommodating conductive thin films for measuring the temperature dependent resistance; the pure substance has ferroelectric properties below the Curie temperature, i.e. the predetermined temperature or, in other words, below the phase transformation temperature. In such case, anisotropic crystal domains can act to form the structure.

Furthermore, mixtures of different ferroelectric materials can also be used. These mixtures likewise have phase transitions, which result in a volume change of the carrier substrate; the volume changes then also affect the conductivity or the resistance of the resistance element and can serve to determine the temperature and thus serve for the calibration of the (primary) temperature sensor.

In an additional embodiment of the apparatus, the ferroelectric material is doped with divalent alkaline earth ions and/or transition metal ions, especially for the formation of uniform crystal domains. Fractional doping or substitution of divalent alkaline earth ions and/or transition metal ions in trace or minor component concentrations under 1% can be used for the formation of more uniform crystal domains in the ferroelectric phase below the Curie temperature, than is the case, for example, with the presence of a pure material such as barium titanate, for example. Such dopings initiate, in the case of the phase transition into the ferroelectric state, a uniform formation of the grain boundaries and therewith an improved reproducibility of the temperature dependence of the phase transformation.

In an additional embodiment of the apparatus, the portion of the doping with divalent alkaline earth ions and/or transition metal ions in the ferroelectric material is up to 1%.

In an additional embodiment of the apparatus, the ferroelectric material is doped with strontium, lead and/or titanate, especially for influencing the phase transformation temperature. In such case, for example, barium titanate can be doped with more than 1% strontium, which usually shifts the Curie temperature of about 120° C. of barium titanate toward lower temperatures.

In an additional embodiment of the apparatus, the ferroelectric material is doped with up to 80% strontium, lead and/or titanate. In order to set a doping in the range of 1% to 80%, for example, strontium carbonate can be added in corresponding stoichiometric proportions, instead of barium carbonate, to a basic sinter process starting material in a sinter manufacturing process. A doping of lead, for example, in the range of 1% to 80% leads to an increase of the phase transformation temperature. Lead carbonate can be added to the starting material for the sinter process in this case.

The phase transformation and thus also the volume change of the ferroelectric material can be subject to hysteresis under certain circumstances. I.e. the phase transformation arises sooner or later, depending on whether the temperature change occurs from a temperature above the phase transformation temperature to a temperature below the phase transformation temperature, or from below the phase transformation temperature to a temperature above the phase transformation temperature.

It has additionally been found that the expansion behavior of the carrier substrate is supplementally influenced by mechanical stresses, such as occur in embedding and coating, and is dependent on the particularly reigning heating or cooling rates.

In an additional embodiment of the apparatus, a voltage can be applied to the ferroelectric material for polarizing such. The apparatus has corresponding means for such purpose. The temperature dependent and, under certain circumstances, hysteretic volume change of the carrier substrate and, respectively, the ferroelectric material can be influenced by applying an electrical voltage. The polarization of crystal domains, through which the ferroelectric effect is produced, can be influenced by applying a voltage. In this way then, the transition between the paraelectric and the ferroelectric phase of the material comprising the substrate can be influenced. Especially, the polarity and the strength of the applied voltage can vary. Finally, the hysteretic phase transformation behavior can be influenced and evaluated by applying the voltage.

The application of the voltage can also serve to bring about a piezoelectric effect, i.e. a deformation, especially an elastic deformation, here of the carrier substrate. The deformations of the carrier substrate then arising also act upon the resistance element and its conductivity or resistance, wherein the conductivity or the resistance of the resistance element, especially during the paraelectric and ferroelectric phases of the material comprising the substrate, differ from one another. This can likewise serve as proof of a phase transformation and be taken into consideration for calibrating the thermometer or temperature sensor.

Additionally, the mechanical relaxation properties or asymmetries of the temperature dependent resistances acting on the resistance element, especially the thin film coating, can be registered. These relaxation properties or asymmetries arise during the applying or after the applying of the electrical voltage to the substrate. Due to the different physical, i.e. mechanical and/or electrical properties, for example, of the paraelectric and the ferroelectric phases, the exceeding of a phase transformation temperature, especially the Curie temperature, can be detected.

In an additional embodiment, an electrical voltage is applied for influencing the phase transformation in the vicinity of, or just below, the phase transformation temperature, especially the Curie temperature; the length changes caused by the voltage lie in an order of magnitude of less than 1%, preferably less than 0.1% of the length of the carrier substrate. Thus, for example, a phase transformation in the case of pure barium titanate due to the voltage applied is already observable below the Curie temperature of 120° C. At temperatures above the Curie temperature the piezoelectric effect provoked by the length change is lost due to the paraelectric properties. This can, in turn, be utilized for calibrating the thermometer or temperature sensor.

In an additional embodiment of the apparatus, a voltage serving to polarize the carrier substrate is applied to the substrate, especially through a capacitor arrangement, where the capacitor arrangement comprises two electrodes, between which electrodes the substrate is arranged. In such case, the resistance element can even be used as one of the two electrodes of the capacitor arrangement. Then, an auxiliary electrode lying on the opposite side of the carrier substrate can serve as the second of the two electrodes of the capacitor arrangement.

A polarization of the ferroelectric material, especially of the carrier substrate, can also be performed by means of two separate, auxiliary electrodes. These auxiliary electrodes can surround the resistance element directly or comprise strip shaped structures, especially comb or meandering structures. In such case, the two electrodes can be electrically insulated from the resistance element. It is only important that an electrical field be produced passing at least sectionally through the substrate; the electrical field causes a piezoelectric effect in the ferroelectric phase of the material.

In an additional embodiment of the apparatus, the temperature sensor and the reference element are arranged in a single sensor head. In such case, the sensor head is the part of the thermometer exposed to the environment of the thermometer where the temperature is to be measured. The reference element and the temperature sensor can thereby thus essentially be exposed to the same ambient temperature. This is especially of use in regard to the preferred application of the thermometer. For example, in industrial plants of the food industry or plants in which pharmaceutical products are produced, in which sterilization methods such as Clean-In-Place (CIP) or Steam-In-Place (SIP) are used, the proposed apparatus can be used. In the case of the methods named, sterilization occurs, for example, with hot steam or water with a temperature between 120° C. and 140° C. This process can then be applied for calibrating the thermometer. For example, since barium titanate $BaTiO_3$ possesses a Curie temperature of 125° C. and a phase transition occurs at this temperature, such can correspondingly be used as a material for manufacture of the reference element.

The resistance element, which, for example, is produced in thin film technology and has a ferroelectric material as a substrate and, in given cases is equipped with an auxiliary electrode on the opposite side of the carrier substrate, can especially be directly adhered or soldered to the inner side of the sensor head so that a connection capable of very good electrical or heat conduction between the substrate or the resistance element and the wall of the thermometer is formed. A similar arrangement is known from Offenlegungsschrift DE102005015691 A1. The typically metal wall of the thermometer serves then simultaneously as a capacitor electrode. This arrangement additionally enables a clear decrease in the thermal response times and static thermally induced measurement errors of the thermometer.

As regards the method, the object is achieved according to the invention by using a reference element for calibration, wherein the reference element is at least partially formed of a ferroelectric material and wherein at least one predetermined temperature a phase transformation of the ferroelectric material is used for calibrating the temperature sensor.

In an embodiment of the method, a solid body is used as a ferroelectric material.

In an additional embodiment of the method, crystal structure, volume and/or dielectric or electrical properties of the ferroelectric material change because of the phase transition of the solid body at least partially comprising a ferroelectric material, wherein at least one of these changes is used for calibrating the temperature sensor.

The measured values or measuring signals obtained by the temperature sensor or reference element can thus be evaluated. Measured values or measuring signals can then be used either for calibrating and/or monitoring the state of the temperature sensor or thermometer.

In an additional embodiment of the method, the temperature sensor and the reference element are essentially exposed to the same ambient temperature.

In an additional embodiment of the method, the thermometer is heated or cooled, in order to induce the phase transformation of the ferroelectric material at a predetermined temperature. The heating or cooling of the thermometer, especially of the portion of the thermometer, in which the temperature sensor and the reference element are located, can be achieved, in such case, either by a heating element provided for such purpose or even by the process itself. For example, a CIP or SIP process in a plant can be utilized for such purpose. The embodiments explained in relationship to the apparatus can be also applied mutatis mutandis to the proposed method.

In an additional embodiment of the method, a ferroelectric material doped with impurity atoms is used, especially in order to influence the phase transformation temperature and or the formation of crystal domains.

In an additional embodiment of the method, a ferroelectric material doped with divalent alkaline earth ions and/or transition metal ions is used for the formation of uniform crystal domains.

In an additional embodiment of the method, a ferroelectric material doped with strontium, lead and/or titanate is used, especially for influencing the phase transformation temperature.

In an additional embodiment of the method, a voltage serving to polarize the ferroelectric material is applied to the ferroelectric material.

In an additional embodiment of the method, a voltage serving to polarize the carrier substrate is applied to the substrate, especially by means of a capacitor arrangement comprising two electrodes, between which the substrate is arranged.

BRIEF DESCRIPTION OF THE DRAWINGS

The invention will now be explained in greater detail based on the appended drawing, the figures of which show as follows.

DETAILED DESCRIPTION IN CONJUNCTION WITH THE DRAWINGS

Figure 1:
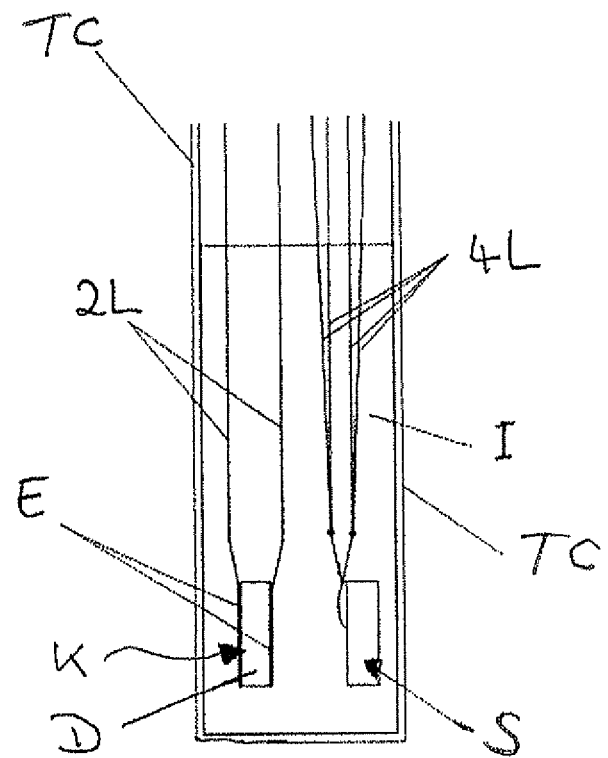
FIG. 1 is a schematic representation of a thermometer with a reference element in the form of a plate capacitor.

FIG. 1 shows a thermometer component TC, in which a temperature sensor S as well as a reference element K in the form of a plate capacitor are arranged. The temperature sensor S and the reference element K are, in such case, electrically insulated from one another. In the shown example of an embodiment, the temperature sensor S is connected in four conductor technology, i.e. there are four connection lines 4L provided, wherein two supply an electrical current and two serve for tapping a measurement voltage. Of course, it also is possible to use other connection types such as, two or three conductor technology, for example, for the temperature sensor S. It is also conceivable to choose another type of temperature sensor S than the measuring resistor shown here.

In order to prevent a dynamic and/or static measurement error, the reference element K, which at least partially comprises a ferroelectric material, is arranged next to the temperature sensor S and consequently is sufficiently close to the same temperature as the temperature sensor S. In FIG. 1, the reference element K is arranged in the temperature measuring component TC at essentially the same height as the temperature sensor S, but spaced from the temperature sensor S. The reference element K comprises, in such case, two electrodes E arranged diametrally relative to one another; the two electrodes E are isolated from one another by a dielectric D, wherein the dielectric D comprises a ferroelectric material, barium titanate in this case. The temperature measuring component TC can be inserted, for example, into a sensor head, which comprises a protective tube, for example. In turn, a temperature transmitter, which serves for producing measured values from the measurement signals of the reference element and temperature sensor, can be placed on the protective tube. The protective tube can also include a process connector, via which the protective tube can be connected to a container, such as a pipe or tank, for example.

In the example of an embodiment in FIG. 1, the temperature sensor S to be calibrated is a Pt100 thin film resistor, for example, and connected to an evaluating electronics with four conductor technology 4L. The evaluating electronics can likewise be arranged in the temperature transmitter in such case. The reference element K is embodied in the form of a capacitor element with a capacitance and connected with two conductors to an evaluating electronics, not shown. The temperature sensor and reference element are integrated in the thermometer component TC and affixed in the tip of the thermometer component with an electrically insulating material, an insulator I. The measuring signals recorded by the temperature sensor and reference element can thus be fed to an evaluating electronics, especially a shared evaluating electronics, for evaluation purposes. The measurement signals can be, for example, the measurement signal representing the capacitance of the reference element K embodied as a capacitor element and, respectively, a measurement signal representing the resistance of the temperature sensor.

Figure 2:
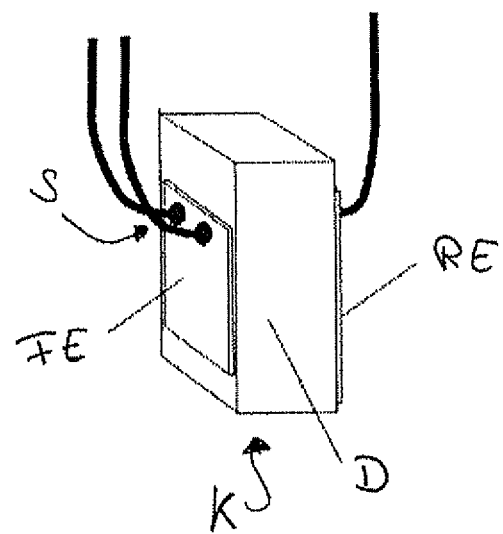
FIG. 2 is a schematic representation of an embodiment, in which a temperature sensor forms an electrode of an reference element embodied as a plate capacitor.

In the example of an embodiment shown in FIG. 2, the reference element and the temperature sensor, i.e. the primary sensor of the thermometer, are integrated into one sensor structure. That means, for example, that the ferroelectric material functions as substrate for a thin film resistor applied thereon or that a thermocouple or resistance wire is wound around the ferroelectric material. Preferably, a Pt100 measuring resistor is the temperature sensor S to be calibrated. In contrast to the form of embodiment from FIG. 1, however, the sensitive platinum layer is applied on a substrate of ferroelectric material. Consequently, the substrate serves, on the one hand, as the carrier of the temperature sensor S, here the measuring resistor; on the other hand however, it also serves as a dielectric of the reference element (secondary sensor) embodied as a capacitor, so that a type of double sensor arises. In the example of an embodiment in FIG. 2, the reference element is also constructed as a capacitor element, wherein the platinum layer serving as a measuring resistor of the temperature sensor forms an electrode, which is called a front electrode FE. The second electrode, which is called a rear electrode RE, is located on the opposite side of the carrier substrate.

In the present example of an embodiment in FIG. 2, the front electrode FE possesses two connection wires, which are utilized both for resistance measurement as well as for capacitance measurement, while the rear electrode RE only has one connection wire for capacitance measurement. Of course, other practical arrangements of the electrodes and connection wires are also possible in order to integrate both a measuring resistance as well as an electrical capacitance on only one substrate. The number of the connection wires used can be correspondingly matched to the measurement circuit used. The sensor structure shown in FIG. 2, analogously to the form of embodiment in FIG. 1, can be integrated into a thermometer component. Passivating layers or tension reliefs of the connection wires, necessary in given cases, are not drawn in FIG. 2 for improving perspicuity.

For example, barium titanate, a ferroelectric with a Curie temperature of about 125° C., can be utilized as a material for the substrate in the variants of embodiment in FIG. 1 and FIG. 2. One of its phase transformations takes place at this temperature. Barium titanate has a cubic crystal lattice above the Curie temperature and below the Curie temperature a tetragonal crystal lattice. Barium titanate also has phase transitions of the crystal structure at other temperatures; these phase transitions can likewise be utilized for calibration. Thus if one heats the thermometer to over 125° C. or cools it below 125° C., a phase transformation is induced, in which the curve of the dielectric constant assumes a maximum (see FIG. 3). The temperature $T_{Ph}$ of this maximum is exactly known and invariable for barium titanate. Since the temperature of the temperature sensor S is simultaneously measured with, for example, the capacitance of the reference element, which so to say serves as a secondary sensor, one can compare the known phase transformation temperature $T_{Ph}$ with the temperature measured by the temperature sensor S in a microprocessor μC and ascertain the deviation of the temperature sensor.

Figure 3:
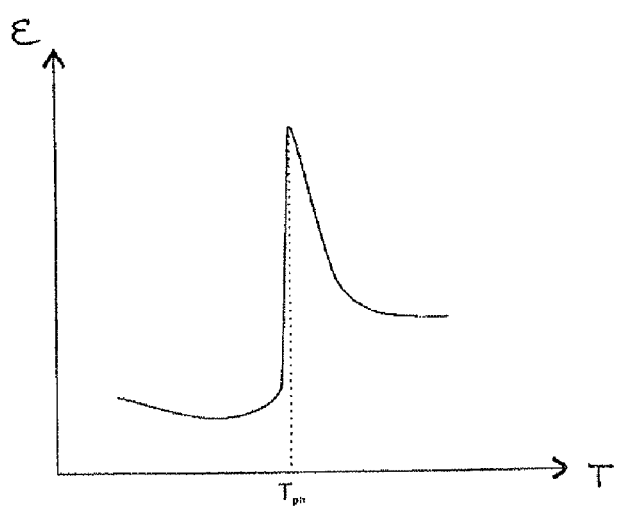
FIG. 3 is a schematic representation of dielectric constant of a ferroelectric material versus temperature.

FIG. 3 shows the curve of the dielectric constant $\in$ as a function of temperature T in the region in which a phase transition of the ferroelectric material takes place at a predetermined temperature value $T_{Ph}$. By way of example, the curve shown here is the dielectric constant $\in$ of barium titanate around the Curie temperature. The dielectric constant $\in$ fluctuates only slightly at temperatures above or below the phase transformation temperature $T_{Ph}$. The dielectric constant $\in$ abruptly reaches a maximum exactly at the predetermined temperature. This maximum of the dielectric constant, or also other reproducible points, especially in a curve, around a phase transformation temperature $T_{Ph}$ can be used as a fixed or reference point for calibrating the temperature sensor S.

Figure 4:
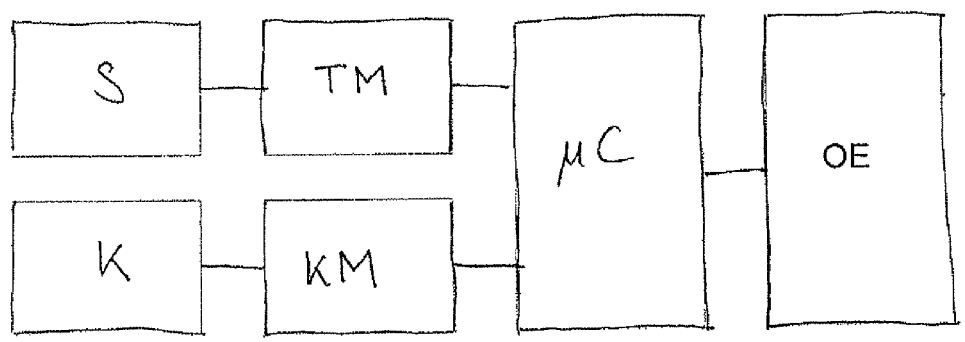
FIG. 4 is a schematic representation of the measured value conditioning according to an embodiment of the invention.

FIG. 4 shows a schematic representation of the operation of an embodiment of the present invention. A temperature measurement TM is performed by means of a temperature sensor S. If the reference element K is a capacitor element as in the embodiment in FIG. 1, for example, then a capacitance measurement KM is performed. Other physical variables are also conceivable as a measured variable of the reference element, which is taken into consideration for calibrating the temperature sensor. The capacitance measurement and the temperature determination can be performed by an evaluating electronics in such case. In a microprocessor μC, the recorded measured values of capacitance of the capacitor element and temperature of the temperature sensor S are so evaluated, in that, for example, they are compared with one another and/or with stored values, and, in given cases, a calibration of the temperature sensor S is performed. Calibration can occur, for example, in the case of the presence of a deviation, which exceeds a predetermined threshold value, of the temperature value measured by the temperature sensor S from the actual temperature value present. The microprocessor, in such case, can likewise be part of the evaluating electronics. The measured values of the reference element and the temperature sensor can also be communicated to a remote evaluating electronics, not shown, for example, by the output electronics OE of the thermometer.

Figure 5:
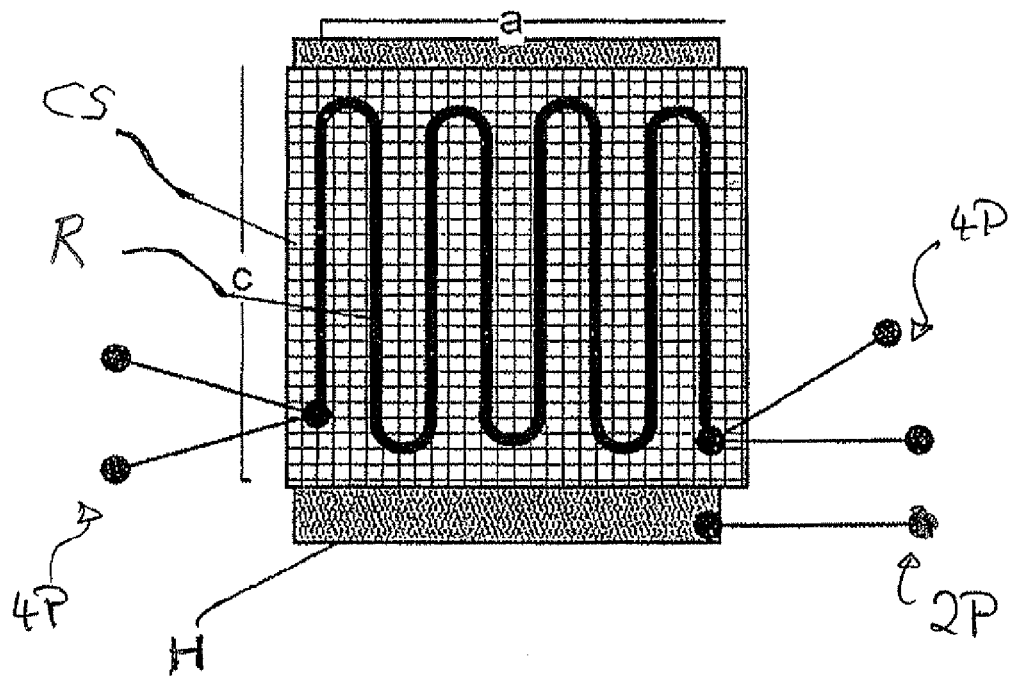
FIG. 5 is a schematic representation of an embodiment, in which the change of electrical resistance at a phase transformation temperature of a temperature sensor arranged on a substrate is utilized for calibrating.

FIG. 5 shows a further example of an embodiment of the present invention. A resistance element R, which is applied to a ferroelectric material serving as a carrier substrate CS, serves as a temperature sensor S. In the example of an embodiment shown in FIG. 5, the resistance element R is arranged in a meander shape on the substrate CS and is contacted with four point technology. An auxiliary electrode H, especially a flush auxiliary electrode, is arranged on the side of the carrier substrate CS lying opposite the resistance element R. An electrical voltage can be applied to the substrate CS via the auxiliary electrode H so that an electrical field passes at least through the substrate CS at least partially. A mechanical deformation of the carrier substrate CS according to the piezo effect can be affected through the application of an electrical field to the substrate CS. Conclusions concerning the current phase of the material comprising the carrier substrate CS can be drawn from the deformation. From this, it can then be determined whether the phase transformation temperature $T_{Ph}$ was exceeded. This phase transformation temperature $T_{Ph}$ then serves as a fixed point for calibrating the resistance element R. Additionally, a polarization of the ferroelectric carrier substrate CS can be produced by means of the applied voltage. Conclusions concerning the current phase of the carrier substrate CS can then also be drawn from the induced polarization. Also, a change of the polarization of the domains in the ferroelectric material can be achieved by applying the voltage and thus a reproducible phase transformation, especially between phases with different electrical properties, can be produced.

In the example of an embodiment in FIG. 5, the temperature sensor and the reference element are also integrated into one sensor structure, comparable to the example of an embodiment in FIG. 2.

Other embodiments, for example, as regards contacting the auxiliary electrode H and the resistance element are also possible with means known from the state of the art. Furthermore, also a multiplicity of options known to those skilled in the art are available for implementing capacitor arrangements, especially according to an example of an embodiment of the present invention.

The invention claimed is:

1. An apparatus for calibrating or validating a thermometer in situ, having:
    a temperature sensor in the form of a resistance element for determining a temperature, wherein an electrical resistance of said resistance element is measured and thereby the temperature is determined; and
    a reference element for calibrating said resistance element, wherein:
    said reference element at least partially comprises a ferroelectric material, which experiences a phase transformation at least at one predetermined temperature in a temperature range relevant for calibrating or validating said resistance element; and
    said resistance element and said reference element are integrated in a thermometer component and wherein said reference element is arranged next to the resistance element and is sufficiently close to the same temperature as the resistance element;
    wherein said reference element comprises a capacitor element with a dielectric, and said ferroelectric material at least partially comprises the dielectric of said capacitor element.

2. The apparatus as claimed in claim 1, wherein:
    said ferroelectric material is a solid body.

3. The apparatus as claimed in claim 1, wherein:
    said ferroelectric material has a crystal structure; and
    the crystal structure of said ferroelectric material changes in the phase transformation.

4. The apparatus as claimed in claim 1, wherein:
    the volume of said ferroelectric material changes in the phase transformation.

5. The apparatus as claimed in claim 1, wherein:
    said ferroelectric material has electrical or dielectric properties, which change in the phase transformation.

6. The apparatus as claimed in claim 1, wherein:
    the phase transformation, especially the change of the electrical or dielectric properties, of said ferroelectric material occurs abruptly at at least one predetermined temperature value.

7. The apparatus as claimed in claim 1, wherein:
said ferroelectric material serves as a substrate for said temperature sensor.

8. The apparatus as claimed in claim 7, wherein:
a phase transformation of the ferroelectric material of said carrier substrate from a ferroelectric state to a paraelectric state, or from a paraelectric state to a ferroelectric state and/or between different crystal structures occurs at at least one predetermined temperature.

9. The apparatus as claimed in claim 1, wherein:
said ferroelectric material serves as a substrate for the resistance element manufactured in thin film technology or thick film technology.

10. The apparatus as claimed in claim 1, wherein:
the predetermined temperature is a phase transformation temperature; and
the ferroelectric material is doped with impurity atoms, in order to influence the phase transformation temperature and/or the formation of crystal domains.

11. The apparatus as claimed in claim 1, wherein:
the ferroelectric material is doped with divalent alkaline earth ions and/or transition metal ions, for the formation of uniform crystal domains.

12. The apparatus as claimed in claim 11, wherein:
the doping with divalent alkaline earth ions and/or transition metal ions in the ferroelectric material is less than 1% of the ferroelectric material.

13. The apparatus as claimed in claim 1, wherein:
the ferroelectric material is doped with strontium, lead and/or titanate, to influence the phase transformation temperature.

14. The apparatus as claimed in claim 13, wherein:
the doping of the ferroelectric material with strontium, lead and/or titanate is up to 80% of the ferroelectric material.

15. The apparatus as claimed in claim 1, wherein:
a voltage serving to polarize the ferroelectric material is applied to the ferroelectric material.

16. The apparatus as claimed in claim 7, wherein:
said substrate serves as a carrier substrate, and
a voltage serving to polarize the carrier substrate is applied to the substrate, via a capacitor arrangement, which comprises two electrodes, between which the substrate is arranged.

17. The apparatus as claimed in claim 1, wherein:
said temperature sensor and said reference element are arranged in a single sensor head.

18. A method for calibrating and/or monitoring the state of a temperature sensor or a thermometer in situ, comprising the steps of:
using a resistance element for determining the temperature by measuring an electrical resistance of said resistance element as temperature sensor; and
using a reference element for calibration and/or monitoring of the thermometer, wherein the reference element at least partially comprises a ferroelectric material; and
exposing said resistance element and said reference element to at least one predetermined temperature at which a phase transformation of the ferroelectric material occurs and evaluating measured values or measuring signals obtained by said temperature sensor or reference element, and using said measured values or measuring signals for calibrating and/or monitoring the state of the temperature sensor or thermometer;
wherein said reference element comprises a capacitor element with a dielectric, and said ferroelectric material at least partially comprises the dielectric of said capacitor element.

19. The method as claimed in claim 18, further comprising the step of:
using a solid body as a ferroelectric material.

20. The method as claimed in claim 18, wherein:
at the phase transformation of the solid body at least partially comprising the ferroelectric material, crystal structure, volume and/or dielectric or electrical properties of the ferroelectric material change, and at least one of these changes is used for calibrating the temperature sensor.

21. The method as claimed in claim 18, wherein:
the temperature sensor and the reference element are essentially exposed to the same ambient temperature.

22. The method as claimed in claim 18, wherein:
the thermometer is heated or cooled in order to induce the phase transformation of the ferroelectric material at the predetermined temperature.

23. The method as claimed in claim 18, wherein:
a ferroelectric material doped with impurity atoms is used, in order to influence the phase transformation temperature and or the formation of crystal domains.

24. The method as claimed in claim 18, wherein:
a ferroelectric material doped with divalent alkaline earth ions and/or transition metal ions is used for the formation of uniform crystal domains.

25. The method as claimed in claim 18, wherein:
a ferroelectric material doped with strontium, lead and/or titanate is used, especially for influencing the phase transformation temperature.

26. The method as claimed in claim 18, further comprising the step of:
applying a voltage serving to polarize the ferroelectric material to the ferroelectric material.

27. The method as claimed in claim 18, further comprising the step of:
applying a voltage serving to polarize the carrier substrate to the substrate, especially by means of a capacitor arrangement, which comprises two electrodes, between which the substrate is arranged.

28. An apparatus for calibrating or validating a thermometer in situ, having:
a temperature sensor in the form of a resistance element for determining a temperature wherein an electrical resistance of said resistance element is measured and thereby the temperature is determined; and
a reference element for calibrating said temperature sensor resistance element, wherein:
said reference element at least partially comprises a ferroelectric material, which experiences a phase transformation at least at one predetermined temperature in a temperature range relevant for calibrating said temperature sensor resistance element;
said resistance element and said reference element are integrated in a thermometer component; and
said reference element and the resistance element are integrated into one sensor structure;
wherein said reference element comprises a capacitor element with a dielectric, and said ferroelectric material at least partially comprises the dielectric of said capacitor element.

* * * * *